Patented Oct. 12, 1948

2,451,312

UNITED STATES PATENT OFFICE 2,451,312

DEHYDRATED FOOD PRODUCT AND METHOD OF MAKING THE SAME

Rhys W. Arengo-Jones, Toronto, Ontario, Canada, assignor to Thomas J. Lipton Limited, Toronto, Ontario, Canada, a company of Canada No Drawing. Application June 4, 1945, Serial No. 597,579. In Canada April 17, 1945

4 Claims. (Cl. 99—204)

My invention relates to new food products and to methods of making the same. More particularly it relates to improved dehydrated food products and to an improved process for the manufacture thereof.

It is a principal object of my invention to provide dehydrated food products which may be added to a predetermined quantity of water and cooked immediately without the necessity of a re-hydration period.

Another object of my invention is to provide dehydrated food products which will carry accurately controlled proportions of sulphur dioxide to preserve colour and flavour for a long period.

Another object of my invention is to provide dehydrated food products which will contain controlled amounts of added sugar and other substances.

Still further objects and advantages of my invention will become apparent from the following description and will be pointed out with particularity in the claims appended to and forming a part of this specification.

My invention is applicable to the dehydration of numerous types of food products but by way of illustration I have described in detail herein its application to the production of an improved dehydrated apple product.

In the manufacture or processing of dehydrated apple products it has heretofore been common practice to follow the successive steps of peeling, coring and hand-trimming the fruit, exposing to the fumes of burning sulphur ($SO_2$) in a fume cabinet or tunnel for bleaching, then slicing or segmenting and dehydrating or evaporating to approximately 22% moisture. The product is then cured to equalize the moisture content and in some cases again exposed to the fumes of burning sulphur ($SO_2$) for preservation of colour and flavour. This final step, known as re-sulphuring, is not always employed but where it is used, a final sulphur dioxide content in the dehydrated or evaporated material of approximately 1000 parts per million is generally aimed at. Due, however, to the difficulty of maintaining a constant concentration of sulphur dioxide in the fume cabinet or tunnel and due also to the varying absorbtion or dissolving properties of the product itself, it is very difficult to control accurately the content of sulphur dioxide in the dehydrated or evaporated material. Also, at the 22% moisture level the sulphur dioxide is not stable with the result that upon exposure of the product to the atmosphere the concentration of sulphur dioxide will decrease more or less rapidly, depending upon atmospheric temperature and humidity, and the product will discolour and lose flavour.

Dehydrated or evaporated products thus prepared are therefore not stable. Also, such products have the additional disadvantage of requiring a reconstitution or re-hydration treatment which consists of soaking them in water for a considerable time before cooking.

I have discovered that the incorporation of crystalline sugar will accelerate the reconstitution period of dehydrated food products. I have also discovered that the sulphur dioxide used for the preservation of colour and flavour in dehydrated foods is more stable in the presence of a higher concentration of sugars and that the concentration of sulphur dioxide to effect stability may be lower if the product is dehydrated and maintained at a lower moisture level.

In the process that I have devised (described herein by way of example as applied to the production of a dehydrated apple product) the apples are first peeled, cored, trimmed, sulphured, sliced or segmented, dehydrated or evaporated, cured and resulphured if necessary. A moisture content of 22% is aimed at and a sulphur dioxide content of from 500 to 1500 parts per million. The process up to this point follows the customary procedure heretofore described and provides the base material for my product. In accordance with my invention this base material is passed through a chopping or grinding machine that will reduce it to small pieces and subject it to sufficient pressure to cause free moisture to come to the surface of the pieces. I then add a predetermined percentage of sugar, together with a predetermined percentage of a suitable sulphite. Also, if desired, a predetermined percentage of flavouring substances such as lemon, spice, or fruit acid may be added at this point. Due to the expressed moisture on the surfaces of the pieces these added materials adhere uniformly thereto and the thus treated pieces are then again passed through a grinder or chopper in order to partly dissolve the added soluble materials and to bring about a thorough incorporation of the added materials. The thus treated product is finally dehydrated or evaporated to a moisture content of approximately 5%.

Due to the presence of the added sugar and the thorough incorporation of the added sulphite, the final dehydration to a moisture content of approximately 5% is accomplished in accordance with my invention with very little loss of flavour and with no effect upon the colour of the product.

The stability of the final product is excellent, the colour and flavour being retained even after long periods of exposure under ordinary atmospheric conditions.

My product does not require the re-hydration period necessary for the reconstitution of dehydrated products heretofore known, and may be added directly to a predetermined amount of water and immediately cooked without the necessity of soaking for long periods.

The following specific example is given, not by way of limitation, but as an indication of how my invention may be utilized in the processing of a typical dehydrated apple product.

Commencing with a standard commercial form of dehydrated or evaporated apple as the basic stock, I first determine the $SO_2$ and sugar content by analysis and then pass the material through the chopping and grinding machine reducing it to small pieces and causing free moisture to come to the surfaces thereof. Thus, for example, with a basic stock having an $SO_2$ content of 1000 parts per million and a normal sugar content, I add to each 100 pounds of the material, 35 pounds of sugar, 1 pound of fruit acid and 1½ ounces of potassium metabisulphite. When the added materials have been thoroughly incorporated into the mix by grinding, the material is dehydrated to a final moisture content of 5% by weight.

I have discovered that the desirable final $SO_2$ concentration for such a product when made in accordance with my process is 300 parts per million and my original analysis of the basic stock determines the controlled amount of sulphite to be added to give this final result. In like manner my preliminary examination and analysis of the basic stock determines the controlled amounts of sugar and other materials to be added with the sulphite.

From the foregoing description it will be seen that my invention provides new and useful dehydrated food products and the scope of the invention also includes method features for the production of such dehydrated products.

While I have described my invention as applied to specific products and in general terms, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. The method of preparing a dehydrated food product which comprises the steps of segmenting, sulphuring, and dehydrating fruit to a moisture content of from 20% to 25% by weight, applying pressure to bring free moisture to the surfaces of the individual segments, adding predetermined amounts of sugar and a suitable sulphite, grinding until the added sugar and sulphite are substantially dissolved and intimately incorporated into the fruit and then dehydrating to a moisture content of approximately 5% by weight to crystallize sugar within the fruit segments.

2. The method of preparing dehydrated fruit, which comprises the initial steps of peeling, coring, trimming, sulphuring, segmenting and dehydrating, plus the further steps of disintegrating the material into small pieces and subjecting said pieces to pressure, adding to said pieces a predetermined amount of sugar and a predetermined amount of a sulphite, and then again crushing the treated material and dehydrating to a moisture content of approximately 5% by weight.

3. A method of preparing a stable fruit product from pieces of dehydrated raw fruit which comprises grinding said pieces under pressure to bring juice to the surface thereof, adding sugar and a sulphite preservative thereto to dissolve in the expressed juice, crushing the mixture to uniformly incorporate the solution into the tissue of each fruit piece, and further dehydrating the fruit to cause sugar to crystallize within the mass of each fruit piece.

4. A method as defined in claim 3 wherein at least 35% of sugar is added to the fruit following said grinding.

R. W. ARENGO-JONES.

REFERENCES CITED

The following references are of record in the file of this patent:

UNITED STATES PATENTS

| Number | Name | Date |
|---|---|---|
| 1,259,634 | King | Mar. 19, 1918 |
| 1,374,160 | Fowler | Apr. 5, 1921 |
| 1,721,929 | Steinwand | July 23, 1934 |
| 1,944,265 | Pilorz | Jan. 23, 1934 |
| 2,137,634 | Hopkins | Nov. 22, 1938 |
| 2,358,086 | Molluer et al. | Sept. 12, 1944 |